(12) United States Patent
Mesh-Iliescu et al.

(10) Patent No.: US 9,558,438 B2
(45) Date of Patent: *Jan. 31, 2017

(54) INFORMATION BROADCAST USING COLOR SPACE ENCODED IMAGE

(71) Applicant: Pictech Management Limited, Limassol (CY)

(72) Inventors: Alisa Mesh-Iliescu, Kfar Saba (IL); Vladimir Kolmanovitch, Netanya (IL)

(73) Assignee: Pictech Management Limited, Limassol (CY)

( * ) Notice: Subject to any disclaimer, the term of this patent is extended or adjusted under 35 U.S.C. 154(b) by 0 days.

This patent is subject to a terminal disclaimer.

(21) Appl. No.: 14/880,431

(22) Filed: Oct. 12, 2015

(65) Prior Publication Data

US 2016/0034806 A1    Feb. 4, 2016

Related U.S. Application Data

(63) Continuation of application No. 13/840,504, filed on Mar. 15, 2013, now Pat. No. 9,159,011.

(51) Int. Cl.
*G06K 19/06* (2006.01)
*H04N 19/44* (2014.01)

(52) U.S. Cl.
CPC ..... *G06K 19/06112* (2013.01); *G06K 19/0614* (2013.01); *H04N 19/44* (2014.11)

(58) Field of Classification Search
CPC .................. G06K 19/0614; G06K 19/06037
USPC .... 235/462.09, 462.01, 462.04, 462.13, 469, 235/487, 494
See application file for complete search history.

(56) References Cited

U.S. PATENT DOCUMENTS

| 5,642,137 A | 6/1997 | Kitazumi |
| 6,993,211 B2 | 1/2006 | Matsui et al. |
| 7,751,585 B2 * | 7/2010 | Jancke ............. G06K 19/06037 235/494 |
| 7,936,901 B2 * | 5/2011 | Jancke ............. G06K 19/06037 235/462.04 |

(Continued)

OTHER PUBLICATIONS

International Search Report and Written Opinion for International Application No. PCT/IB14/01482 mailed Dec. 29, 2014. 12 pages.

(Continued)

*Primary Examiner* — Paultep Savusdiphol
(74) *Attorney, Agent, or Firm* — Wilmer Cutler Pickering Hale and Dorr LLP

(57) ABSTRACT

Embodiments of the present disclosure can include systems, methods, and non-transitory computer program products for using color space encoded images to perform image-based information broadcasting. In certain aspects, the information broadcasting can include using the encoded images to broadcast information to multiple devices within view of the encoded images. Embodiments can also include broadcasting information independent of network availability. In certain aspects, a public display having a camera can register or capture a color space encoded image from a remote device, where the encoded image encodes a request for information from a user. The public display can send the encoded image to be decoded, and receive the decoded request for information. The public display can encode an encoded image representing a response, and display the encoded image representing a response for decoding by the user.

17 Claims, 10 Drawing Sheets

(56) References Cited

U.S. PATENT DOCUMENTS

| | | |
|---|---|---|
| 7,997,491 B2* | 8/2011 | Kuyper-Hammond ....... G06K 19/06037 235/454 |
| 7,997,502 B2 | 8/2011 | Lv et al. |
| 8,430,329 B2 | 4/2013 | Kiuchi et al. |
| 2002/0060246 A1* | 5/2002 | Gobburu ................. G06Q 20/04 235/462.46 |
| 2003/0058261 A1* | 3/2003 | Challa ..................... G06F 3/002 345/690 |
| 2003/0072468 A1 | 4/2003 | Brunk et al. |
| 2006/0027662 A1 | 2/2006 | Baradi |
| 2006/0045362 A1 | 3/2006 | Ito et al. |
| 2006/0098241 A1 | 5/2006 | Cheong et al. |
| 2006/0157574 A1* | 7/2006 | Farrar ................... G06F 21/608 235/494 |
| 2006/0256114 A1 | 11/2006 | Nielsen et al. |
| 2006/0274952 A1* | 12/2006 | Nakai ................... G06K 7/1095 382/232 |
| 2007/0119940 A1* | 5/2007 | Futamura ............... G06K 1/121 235/462.11 |
| 2007/0153916 A1 | 7/2007 | Demircin et al. |
| 2007/0278303 A1* | 12/2007 | Cattrone .......... G06K 19/06009 235/462.1 |
| 2008/0137952 A1* | 6/2008 | Kokemohr .......... G06F 3/04845 382/173 |
| 2008/0298688 A1 | 12/2008 | Cheong et al. |
| 2009/0045259 A1 | 2/2009 | Ehrhart et al. |
| 2009/0310874 A1 | 12/2009 | Dixon et al. |
| 2010/0038439 A1* | 2/2010 | Kuyper-Hammond ....... G06K 19/06037 235/494 |
| 2010/0039448 A1 | 2/2010 | Kokemohr |
| 2010/0282851 A1 | 11/2010 | Bulan et al. |
| 2010/0282856 A1 | 11/2010 | Bulan et al. |
| 2010/0327066 A1 | 12/2010 | Khan |
| 2011/0017826 A1* | 1/2011 | Mohan ............... G06K 7/10722 235/462.11 |
| 2011/0049244 A1* | 3/2011 | Wang ............... G06K 19/06037 235/470 |
| 2011/0058049 A1 | 3/2011 | Grindstaff et al. |
| 2012/0187193 A1 | 7/2012 | Endo |
| 2012/0269427 A1 | 10/2012 | Simske et al. |
| 2012/0301022 A1* | 11/2012 | Yang ..................... H04N 19/186 382/166 |
| 2012/0311320 A1 | 12/2012 | Brown et al. |
| 2013/0092738 A1 | 4/2013 | Blasinski et al. |
| 2013/0161395 A1* | 6/2013 | Tian ................. G06K 19/06056 235/462.04 |
| 2013/0161396 A1* | 6/2013 | Ming ................. G06K 7/10712 235/462.04 |

OTHER PUBLICATIONS

International Search Report and Written Opinion for International Application No. PCT/IB14/01468 mailed Jan. 15, 2015. 9 pages.

* cited by examiner

INFORMATION BROADCAST USING COLOR SPACE ENCODED IMAGE

CROSS-REFERENCE TO RELATED APPLICATIONS

This application is a continuation of U.S. patent application Ser. No. 13/840,504, filed Mar. 15, 2013, to be issued as U.S. Pat. No. 9,159,011 on Oct. 13, 2015, entitled "Information Broadcast Using Color Space Encoded Image," the contents of which are expressly incorporated by reference herein in its entirety and for all purposes.

This application is also related to the following applications:

U.S. patent application Ser. No. 13/836,447 entitled "Data Storage and Exchange Device For Color Space Encoded Images;"

U.S. Pat. No. 9,027,842 entitled "Broadcasting Independent of Network Availability Using Color Space Encoded Image;"

U.S. patent application Ser. No. 13/837,155 entitled "Image Encoding and Decoding Using Color Space;"

U.S. Pat. No. 9,152,830 entitled "Color Restoration for Color Space Encoded Image;"

U.S. Pat. No. 9,042,663 entitled "Two Level Error Correcting Codes for Color Space Encoded Image;"

U.S. patent application Ser. No. 14/719,759 entitled "Two Level Error Correcting Codes for Color Space Encoded Image;"

U.S. Pat. No. 9,014,473 entitled "Frame of Color Space Encoded Image for Distortion Correction;"

U.S. Pat. No. 8,973,844 entitled "Information Exchange Using Photo Camera as Display for Color Space Encoded Image;"

U.S. Pat. No. 9,027,843 entitled "Information Exchange Display Using Color Space Encoded Image;"

U.S. Pat. No. 9,117,151 entitled "Information Exchange Using Color Space Encoded Image;"

U.S. patent application Ser. No. 14/834,247 entitled "Information Exchange Using Color Space Encoded Image;"

U.S. patent application Ser. No. 13/844,184 entitled "Large Documents Using Color Space Encoded Image;"

U.S. patent application Ser. No. 13/844,207 entitled "Combination Book With E-Book Using Color Space Encoded Image;"

U.S. Pat. No. 9,129,346 entitled "Image Fragmentation for Distortion Correction of Color Space Encoded Image;"

U.S. Pat. No. 9,147,143 entitled "Book Using Color Space Encoded Image;"

U.S. patent application Ser. No. 13/844,127 entitled "Data Backup Using Color Space Encoded Image;" and U.S. Pat. No. 9,152,613 entitled "Self-Publication Using Color Space Encoded Image."

FIELD OF THE DISCLOSURE

The present disclosure relates to applications of and exchange devices for color space encoded images, and methods of encoding and decoding color space encoded images. More particularly, the present disclosure relates to encoding and decoding of machine-based data using high capacity multi-colored composite two-dimensional pictures having different symbols organized in specific order and sets in a color space.

BACKGROUND

With smartphones and tablets having become widely deployed as well as 3G and Wi-Fi based access to Internet, data capture technologies work as an interface between databases and user devices. Example data capture technologies include bar codes, QR codes, Radio Frequency Identification (RFID) and Near Field Communication (NFC). Most of these technologies are used as either a visible or an invisible tag to connect these databases and user devices. The introduction of cloud storage adds extended use of data exchange between data storage and end user devices.

Many households include many different devices simultaneously connected to Wi-Fi access points. This ubiquitous Wi-Fi usage increases electromagnetic fields around the home environment. Despite the usefulness of Wi-Fi, long term consequences for the human body and general health are not clear.

End user devices such as smartphones and tablets are frequently equipped with photo and/or video cameras. These cameras can be used for capturing information presented in different visual forms. The other data capture technologies descried earlier, including bar codes and especially two dimensional (2D) bar codes such as QR codes, have attracted the attention of many researchers and companies due to the potential for inexpensive operation.

Bar codes have been used for mobile applications to deliver a multitude of different mobile services over mobile phones and other mobile communication or computing devices. Such applications range from providing Uniform Resource Locator (URL) information to link a mobile device to the Internet, through to using a bar code as a form of e-ticket for airlines or event admissions. Hence, there is an ever growing demand for higher capacity bar codes, suited for robust application on mobile devices. Traditional approaches to higher capacity bar codes include: (i) using a colored symbol set and (ii) increasing the size of the bar code. There are known limitations for either approach, especially related to mobile devices with compromised, low resolution cameras. The traditional data capacity of 1D and 2D bar codes is severely limited. This severely limited data capacity constrains possible applications of 1D and 2D bar codes, and their primary task is simply linking camera phones to designated Web sites. Additional tasks may then be performed based on the Web site. This operation again is based on using of Wi-Fi or 3G connectivity.

The maximum data capacity of 2D bar codes has been improving over the recent years, resulting in the introduction of newer applications.

Presently, the use of color-based bar code and other symbolic encoding in color space technologies using mobile devices such as camera mobile phones has been limited by the physical size of the actual bar code symbol in relation to the information encoded within, and also by the image capturing mechanism on mobile devices to discriminate or resolve effectively a greater multitude of colors, especially under varied lighting conditions by an inexperienced, lay user. Another limiting factor has been color fidelity of hard copy output devices, such as color printers, in reproducing the true colors of such color based bar code or symbol sets in a color space.

While bar codes can be used to provide 2D encoded data, they have not been used to provide real storage devices and media.

SUMMARY

Embodiments of the present disclosure can include systems, methods, and non-transitory computer program products for using color space encoded images to perform image-based information broadcasting. In certain aspects, the information broadcasting can include using the encoded images to broadcast information to multiple devices within view of the encoded images. Embodiments can also include broadcasting information independent of network availability. In certain aspects, a public display having a camera can register or capture a color space encoded image from a remote device, where the encoded image encodes a request for information from a user. The public display can send the encoded image to be decoded, and receive the decoded request for information. The public display can encode an encoded image representing a response, and display the encoded image representing a response for decoding by the user.

In accordance with the disclosed subject matter, systems, methods, and non-transitory computer program products are provided for broadcasting information.

Certain embodiments include methods for broadcasting information. The method includes receiving information for broadcasting and creating an image encoding the information by creating colored cells within a color space to provide an encoded representation of the received information in an image by processing the received information to obtain a stream of integers, each integer in the stream of integers corresponding to a color in the color space for a cell in the image and creating one or more additional cells adjoining the encoded image, the one or more additional cells for assisting in decoding the encoded image. The method also includes displaying the encoded image for a plurality of devices to decode.

Certain embodiments include systems for broadcasting information. The system includes at least one processor configured to receive information for broadcasting and create an image encoding the information by creating colored cells within a color space to provide an encoded representation of the received information in an image by processing the received information to obtain a stream of integers, each integer in the stream of integers corresponding to a color in the color space for a cell in the image and creating one or more additional cells adjoining the encoded image, the one or more additional cells for assisting in decoding the encoded image. The at least one processor is also configured to display the encoded image for a plurality of devices to decode.

Certain embodiments include non-transitory computer program products for broadcasting information. The non-transitory computer program product is tangibly embodied in a computer-readable medium. The non-transitory computer program product includes instructions operable to cause a data processing apparatus to receive information for broadcasting and create an image encoding the information by creating colored cells within a color space to provide an encoded representation of the received information in an image by processing the received information to obtain a stream of integers, each integer in the stream of integers corresponding to a color in the color space for a cell in the image and creating one or more additional cells adjoining the encoded image, the one or more additional cells for assisting in decoding the encoded image. The instructions are also operable to cause a data processing apparatus to display the encoded image for a plurality of devices to decode.

BRIEF DESCRIPTION OF THE DRAWINGS

Various objects, features, and advantages of the present disclosure can be more fully appreciated with reference to the following detailed description when considered in connection with the following drawings, in which like reference numerals identify like elements. The following drawings are for the purpose of illustration only and are not intended to be limiting of the invention, the scope of which is set forth in the claims that follow.

DETAILED DESCRIPTION

The present systems and methods allow for use of 2D color-space codes to encode images with greater data capacity. The 2D color-space encoded images described herein can provide a wide variety of applications, regardless of network connectivity. The present systems and methods allow a sufficient amount of data or even an entire database to be encoded and placed in a storage device using the 2D images encoded and organized by color-space codes as described herein.

The present disclosure has utility in, for example, data back-up storage applications or data exchange using mobile devices to provide color two-dimensional pictures for processing.

Figure 1:
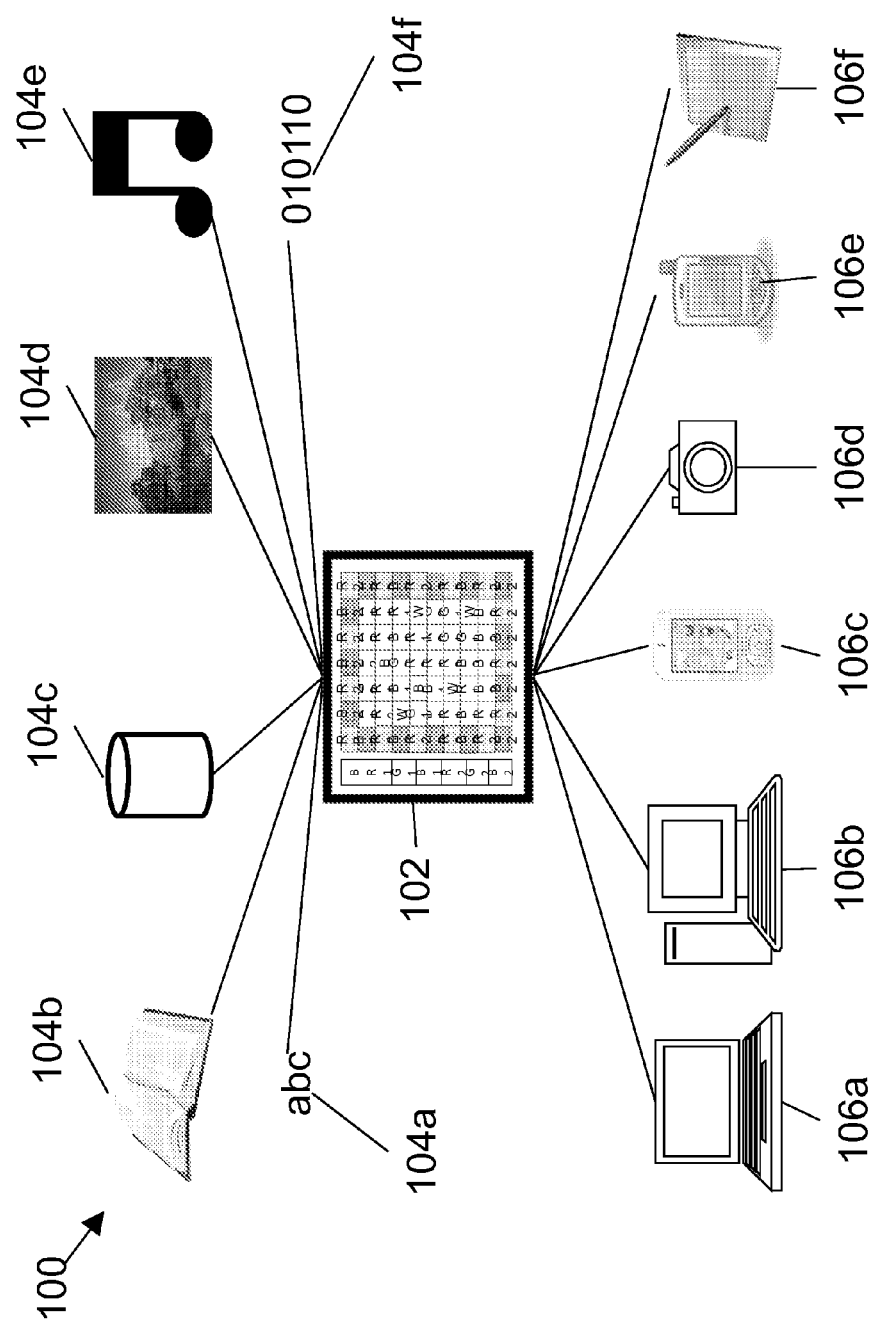
FIG. 1 illustrates a system for storing, encoding, and decoding a 2D color space image in accordance with certain embodiments of the present disclosure.

FIG. 1 illustrates a system 100 for storing, encoding, and decoding a 2D color space image in accordance with certain embodiments of the present disclosure. System 100 includes a 2D color space image 102. System 100 can encode any type of desired machine-based data. Non-limiting examples of machine-based data include text 104a, books 104b (containing, for example, text and images), databases 104c, photographs 104d or other artwork, images, video, film, or movies, music 104e, or any other type of binary data 104f.

In some embodiments, capturing of desired data can be done using a conventional camera or scanner, or a smartphone or tablet camera.

For example, a user can encode selected information into a 2D color-space coded image and print the image on any desired media (e.g., paper, textile, plastic, etc.). The 2D color-space coded image can also be depicted on any display, including posters, TV screens or computer monitors, as well as displayed on mobile devices such as smartphones or tablets. Digital photo cameras can be used as display devices as well.

Using a capturing device (e.g., a conventional camera or scanner or a smartphone or tablet camera) with an external PC or internal processor having image reading or decoding software, the image code can be decoded and the encoded data can be read. The present systems and methods allow information to be retrieved, decoded, and saved in the memory of a device or presented on a display for further use. For example, the decoded data can be read on a laptop computer 106a or a desktop computer 106b, a smart phone 106c, a photo camera 106d, a palmtop or handheld device 106e, or a tablet 106f. All this can be done without manual work. No network connectivity or additional cost is required.

High Volume Data Storage and Exchange Device and Encoding/Decoding Methods

The present systems and methods relate to a data storage device for storing 2D color space encoded images, methods of encoding and decoding the 2D color space encoded images, and application of the 2D color space encoded images to data exchange.

More particularly, the present disclosure relates to encoding, transmission, and decoding of machine-based data using an appropriately formatted high capacity color image. The present systems and methods can be utilized, for example, for compact backup of printed materials, and/or data exchange between a color-image-displaying device and a plurality of image-reading devices.

Figure 2A:
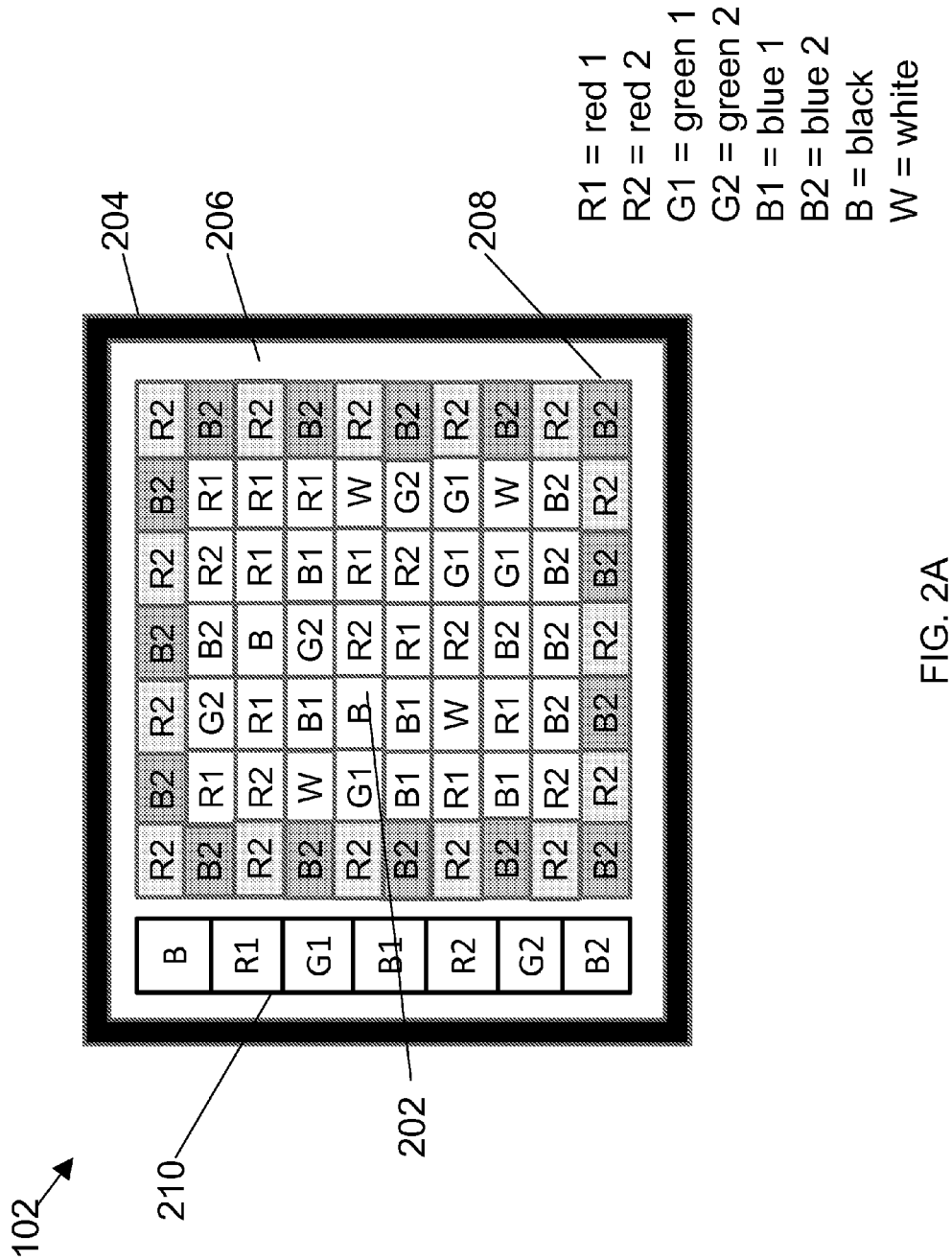
FIGS. 2A-2B illustrate the 2D color space encoded image in accordance with certain embodiments of the present disclosure.
Figure 2B:
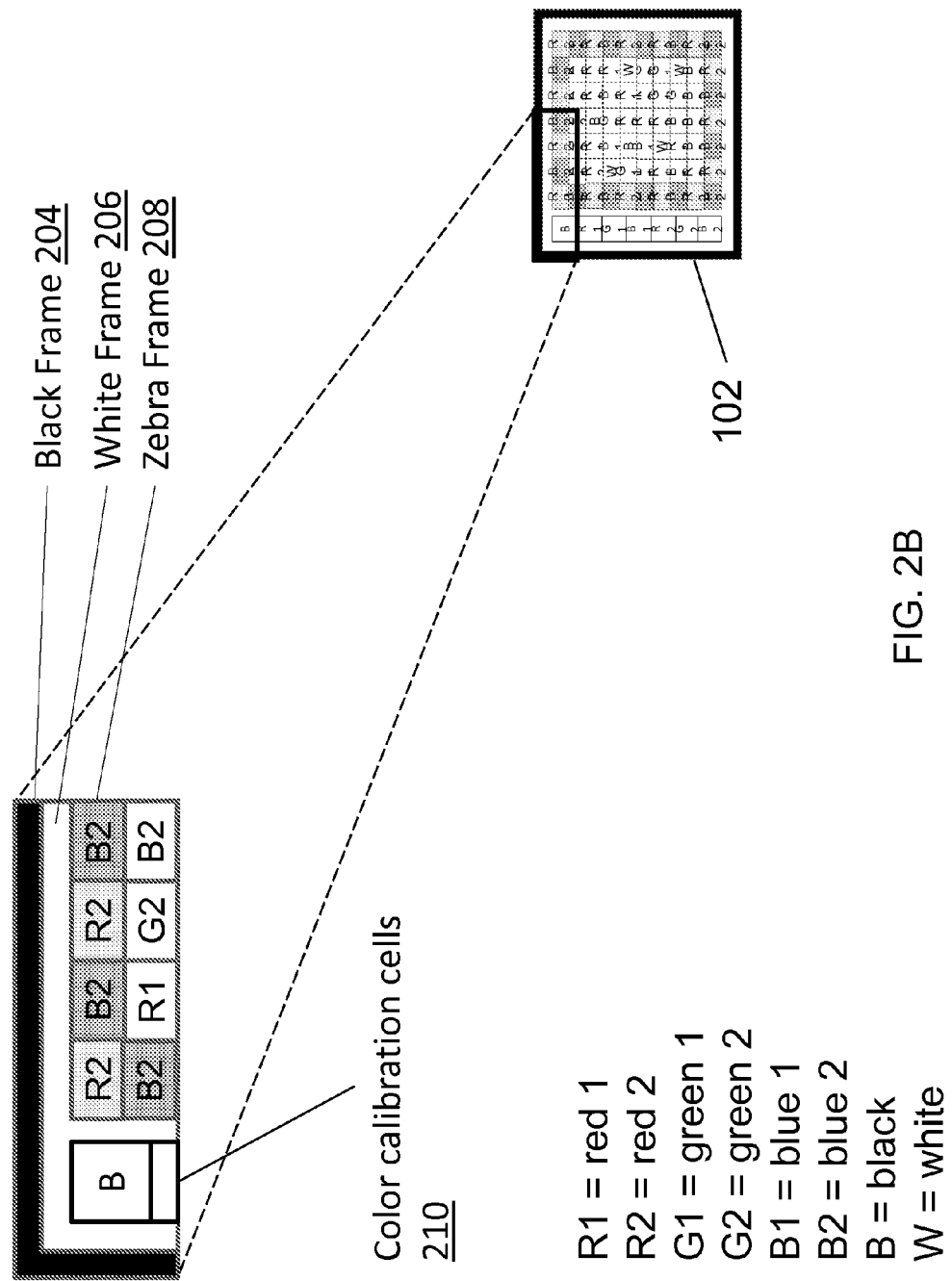

FIGS. 2A-2B illustrate the 2D color space encoded image 102 in accordance with certain embodiments of the present disclosure. As illustrated in FIG. 2A, encoded image 102 includes a number of rectangular cells 202 of different colors. In some embodiments, encoded image 102 can include a black frame 204, a white frame 206, a "zebra frame" 208 having alternating colors, and color calibration cells 210.

FIG. 2B illustrates a close-up view of the black frame 204, the white frame 206, the zebra frame 208, and the color calibration cells 210 in accordance with certain embodiments of the present disclosure. Black frame 204 and white frame 206 can be used for rough localization of the data image including rectangular cells 202, determination of geometric distortion of the data image, and estimation of cell size and scale of rectangular cells 202. Zebra frame 208 can be used for further calibration of cell size for rectangular cells 202. Color calibration cells 210 can be used for determining a number of colors $N_c$ used for encoding the data, and for indexing the colors to map the colors to numbers for encoding and decoding.

In some embodiments, rectangular cells 202 can use more than eight different colors. The number of colors can be expressed as $N_c$, for example $N_c \geq 8$. Preferably, the number of colors is selected to be a power of two.

Figure 3:
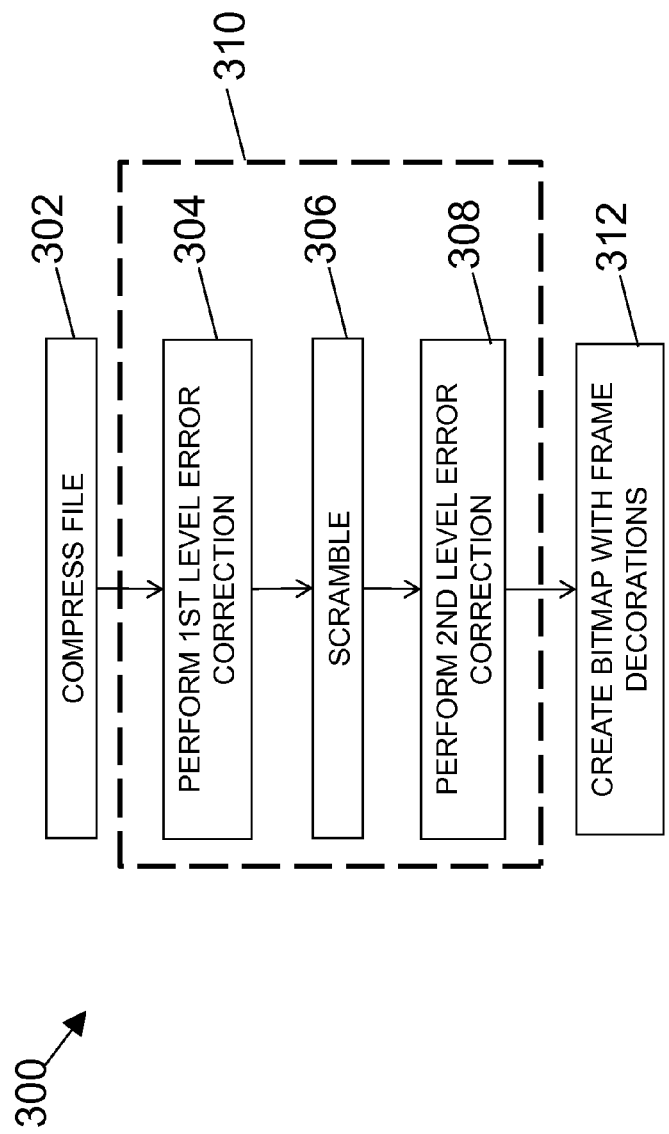
FIG. 3 illustrates a method that the system performs for encoding an image in accordance with certain embodiments of the present disclosure.

FIG. 3 illustrates a method 300 that the system performs for encoding an image in accordance with certain embodiments of the present disclosure.

The choice of appropriate color-difference metrics can help achieve stable color resolution for image-source media and image-reading devices. Most imaging devices operating in the visible spectrum are adapted to human eye color resolution. A color space describes color capabilities of a particular device by relating numbers to actual colors. Embodiments of the present disclosure utilize metrics based on low-cost non-Euclidean distance in red green blue (RGB) color space.

In some embodiments, the present system uses color space metrics which are close to Commission International de l'eclairage (CIE) 1976 (L*,u*,v*) color space metrics. The CIELUV color space distributes colors roughly proportional to perceived color differences. In other embodiments, the present systems and methods are able to use any color space, including the CIE 1931 XYZ color space, CIELAB color space, and CIEUVW color space. Although embodiments of the present system are based on the CIELUV color space, according to experimentation, the color space used in certain embodiments is advantageously less sensitive to a color temperature of relevant image displaying media or device, and advantageously less sensitive to external illumination. Assuming R, G, and B are one byte (i.e., 0 . . . 255 or 0x0 . . . 0xFF) normalized intensity of red, green and blue color components correspondingly, a color difference $\Delta C$ between colors $C_1=(R_1, G_1, B_1)$ and $C_2=(R_2, G_2, B_2)$ can be given by the following equations:

$$\bar{r} = \frac{R_1 + R_2}{2} \qquad \text{Equation (1)}$$

$$\Delta R = R_2 - R_1$$

$$\Delta G = G_2 - G_1$$

$$\Delta B = B_2 - B_1$$

$$\Delta C = \sqrt{\left(2 + \frac{\bar{r}}{256}\right)\Delta R^2 + 4\Delta G^2 + \left(2 + \frac{255 - \bar{r}}{256}\right)\Delta B^2}$$

where $\bar{r}$ describes an average red component value of $C_1$ and $C_2$.

The present system first receives machine data for encoding into an image. For example, the machine data can be contained in a file. The present system compresses the file (step 302). For example, the machine data can be compressed into a binary compressed file such as zip, rar, arc or any other archive format file.

The present system then determines an appropriate color encoding, illustrated by box 310. For example, the present system maps the resulting code sequence to a stream of integers from 0 to $N_c-1$, inclusive. Using the stream of integers, the present system creates a bitmap with frame formatting. Generation of frame formatting is described in further detail later. The present system fills the interior of the frames with color bitmap cells, encoded as described following. In some embodiments, the encoding can use error correction. A non-limiting example of error correction is the two-stage error correction described herein. In some embodiments, the encoding can use scrambling. In some embodiments, the encoding can use error correction in combination with scrambling. The present system determines the color of each cell based on the color calibration cells. The resulting encoded image can then be sent to any display, including a color printer, display, or other color image output device.

In some embodiments, the present system then performs a first level of error correction (step 304). One benefit of error correction is that the present system is able to decode an image properly, even if a portion of the image is damaged. For example, the present system can determine a header containing a cyclic redundancy check (CRC) error-detecting code, file name, format information, and sequence number (e.g., if the machine data and resulting encoded image represent only part of a larger data stream such as a video stream). In some embodiments, the present system can use any error detecting code such as repetition codes, addition of parity bits, checksums, hash functions, or more powerful error correcting codes.

In some embodiments, the present system can use a Reed-Solomon encoder of high order. A Reed-Solomon error correction code is a cyclic error-correcting code capable of detecting and correcting multiple errors in a bit stream. For example, the present system can use 8-bit words and blocks of size 255 bytes, if $N_c$=16. In further embodiments, the present system can use other error-correcting codes such as low-density parity-check (LDPC) codes or turbo codes. Reed-Solomon error correction codes are capable of detecting errors, erasures, and combinations thereof. In some embodiments, a word size for this high order level of Reed-Solomon encoding can be equal to $k*\log_2(N_c)$ rounded down, where k>1. As described herein, in some embodiments the two-stage error coding can perform high order Reed-Solomon encoding in a first stage, and low order Reed-Solomon encoding in a second stage. The second stage can also include smaller words. For example, the word size can be equal to $\log_2(N_c)$ bits, rounded down.

In some embodiments, the present system then scrambles the obtained code (step 306). For example, the resulting code can be interleaved using a predefined pseudorandom sequence. The present system scrambles the obtained code to spread out potential errors. Accordingly, the two-level error correction described herein can perform better. That is, when registering or capturing an image for decoding, there can be color distortions due to non-uniform lighting, or damage on the media on which the image is printed. For example, the media can have spots, be wrinkled, and the like. The scrambling provides that "bad" color cells with uncertain data can be distributed uniformly (i.e., independently) into different encoding blocks, thereby decreasing the number of errors per block. Because error correction can have upper limits of correctable errors, the present spreading improves the effectiveness of the error correction.

In some embodiments, the present system then performs a second level of error correction (step 308). For example, the resulting scrambled code is encoded using a Reed-Solomon encoder with. For the second level of error correction, the word size can be selected to be smaller than the word size used in the first level of error correction. As described earlier, this two-stage error correction allows the present system to mark unrecoverable blocks of data during a first stage as erasures. The error correction described herein finds an index location of an error word inside a block, and also corrects the error word to its correct or true value. The two-stage error correction allows the present system to correct twice as many erasures as errors, as described in more detail later.

Registration

The present system is able to use any kind of high definition (HD) color registration device to register an encoded image. Non-limiting example registration devices can include a digital camera, a smartphone camera, a tablet camera, a video camera, a webcam, a scanner (to scan a hard copy image), etc.

Decoding

Figure 4:
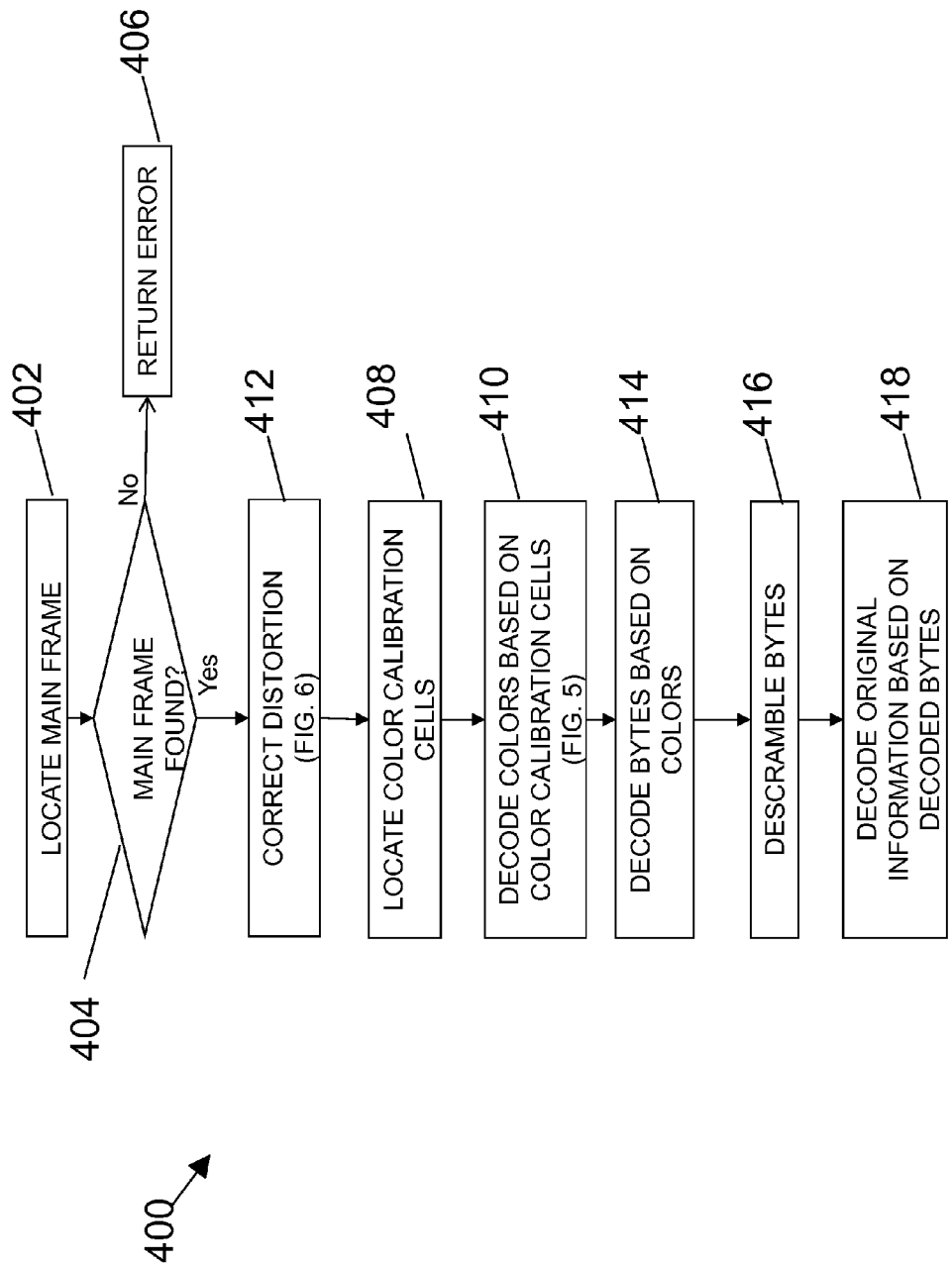
FIG. 4 illustrates a method that the system performs for decoding an image in accordance with certain embodiments of the present disclosure.

FIG. 4 illustrates a method 400 that the system performs for decoding an image in accordance with certain embodiments of the present disclosure.

Once an encoded image is registered, the present system can copy a registered image to any processing device containing a decoding module. An example processing device can include a computer, containing a decoding module with computer-readable instructions for decoding, where the computer-readable instructions are stored on a non-transitory computer storage medium, or containing hardware having hard-coded or embedded decoding instructions stored thereon.

Generally, decoding method 400 includes two high-level processes: (1) image recognition, and (2) two-stage Reed-Solomon decoding. In some embodiments, the present system uses Viterbi decoding as a Reed-Solomon decoder.

The present system locates the main frame (step 402). For example, the present system can locate the black frame and the white frame vertices. The present system can further determine the middles of the corresponding edges of the black frame and the white frame. If the main frame is not found (step 404: No), the present system returns an error (step 406). For example, the error can be that the image cannot be decoded, or the error can be more specific such as that the main frame cannot be found.

If the main frame is found (step 404: Yes), the present system corrects geometric distortion based on the main frame and the zebra frame (step 412). Geometric distortion can occur when a user uses a camera lens, for example on a smartphone or tablet camera, or on a digital camera, to decode an image. Accounting for distortion is described in further detail later, in connection with FIG. 6.

The present system locates the color calibration cells (step 408). As described earlier in connection with FIGS. 2A-2B, in some embodiments, the color calibration cells are located inside the black frame and the white frame, on the left of the rectangular cells encoding the machine data. In other embodiments, the color frame could be located outside the black frame, between the black and white frames, or in other locations within the white frame.

Based on the color frame, the present system decodes the colors in the rectangular cells (step 410). In general, for every pixel found in the encoded image, the present system finds the closest sample pixel based on the color calibration cells and substitutes the sample pixel for the detected pixel. In some embodiments, the present system obtains a color-value correspondence. The present system determines cell size calibration based on the zebra frame. The present system divides the data image into color cells. When decoding the image, the present system captures or collects all colors belonging to a given pixel rectangle. If most of the pixel colors in the pixel rectangle could be recognized as one color from the color calibration cells, that color from the color calibration cells is used. Otherwise, the present system marks the pixel as an erasure. If a pixel-level block cannot be decoded, the present system treats the whole pixel block as an erasure. The present system reads the rectangular cells sequentially and determines an index of the nearest color from the color calibration cells to the median cell color. In particular, the present system determines the nearest color according to nearest Euclidean distance in the appropriate color space, according to Equation (1), described earlier.

The present system decodes the bytes (step 414). In some embodiments, the present system applies a corresponding decoder to the error-correcting encoder described earlier. For example, the present system applies a low-level Reed-Solomon decoder to the code stream obtained from the decoded colors. Accordingly, due to the nature of the error-correcting code, the present system is able to restore erasures and errors in the code stream. If the present system detects unrepairable blocks, the unrepairable blocks are marked as "erasures."

The present system then descrambles the bytes (step 416). In some embodiments, the present system de-interleaves the resulting byte stream.

The present system then decodes the original information based on the decoded byte stream (step 418). In general, the present system uses a corresponding decoder to the error-correcting encoder described earlier, to restore pixel-block-level erasures and errors. In some embodiments, the present system applies a high-level Reed-Solomon decoder. After applying the high-level Reed-Solomon decoder, if some pixel blocks remain un-repairable, the present system attempts to change the indices to those indices corresponding to the next nearest color in the color calibration cells, and then repeats Reed-Solomon decoding of the modified block. If error free data is obtained, the present system maps the resulting sequence of integers to a bit stream. The present system then parses the resulting bit stream and computes a cyclic redundancy check (CRC) of the data. The present system compares the resulting CRC with the CRC contained in the header of the image. The present system then saves or appends the file. Two-level COLOR error correction schema with erasures and statistical color restoration The two-level error correction used in the present system and described earlier in connection with FIGS. 3 and 4 allows the present system to correct two types of errors: errors and erasures. In some embodiments, the Reed-Solomon error-correction encoding used is able to detect errors (which correspond to wrong, incorrect, or unexpected information) and erasures (which correspond to absent or missing information).

In some embodiments, correcting erasures can be performed twice as effectively than correcting errors. To make use of this feature, the present system uses a two-level error correction schema.

For example, assume $N_c=16$ (i.e., $2^4$). Accordingly, there are sixteen distinctive colors which allow an encoded image to encode 4 bits of information per rectangular cell. Every byte of information (8 bits) is encoded by two color indices. The error correction scheme has two levels. First, the byte array is divided into chunks, and every chunk is appended with Reed-Solomon source control data. Second, every byte is divided into two half-bytes (4 bits). The half-bytes are then gathered into groups or chunks which are appended with Reed-Solomon source control data. For example, the present system can process $<N_c-1$ half-bytes. That is, if $N_c=16$, the present system gathers less than fifteen half-bytes. The group of half-bytes is then appended with Reed-Solomon source control data determined based on the group of half-bytes. Because the Reed-Solomon source control data can be about the same size as the input data, the addition of the Reed-Solomon source control data results in the size of the group reaching fifteen bytes. For example, the size of the input data and the control data block size can be fifteen bytes. Each half-byte in the group is mapped to an appropriate color, for example by using the corresponding half-bytes as indices into the color array. Accordingly, the encoding process applies two levels of Reed-Solomon encoding, first at the byte array level and second at the half-byte level.

Figure 5:
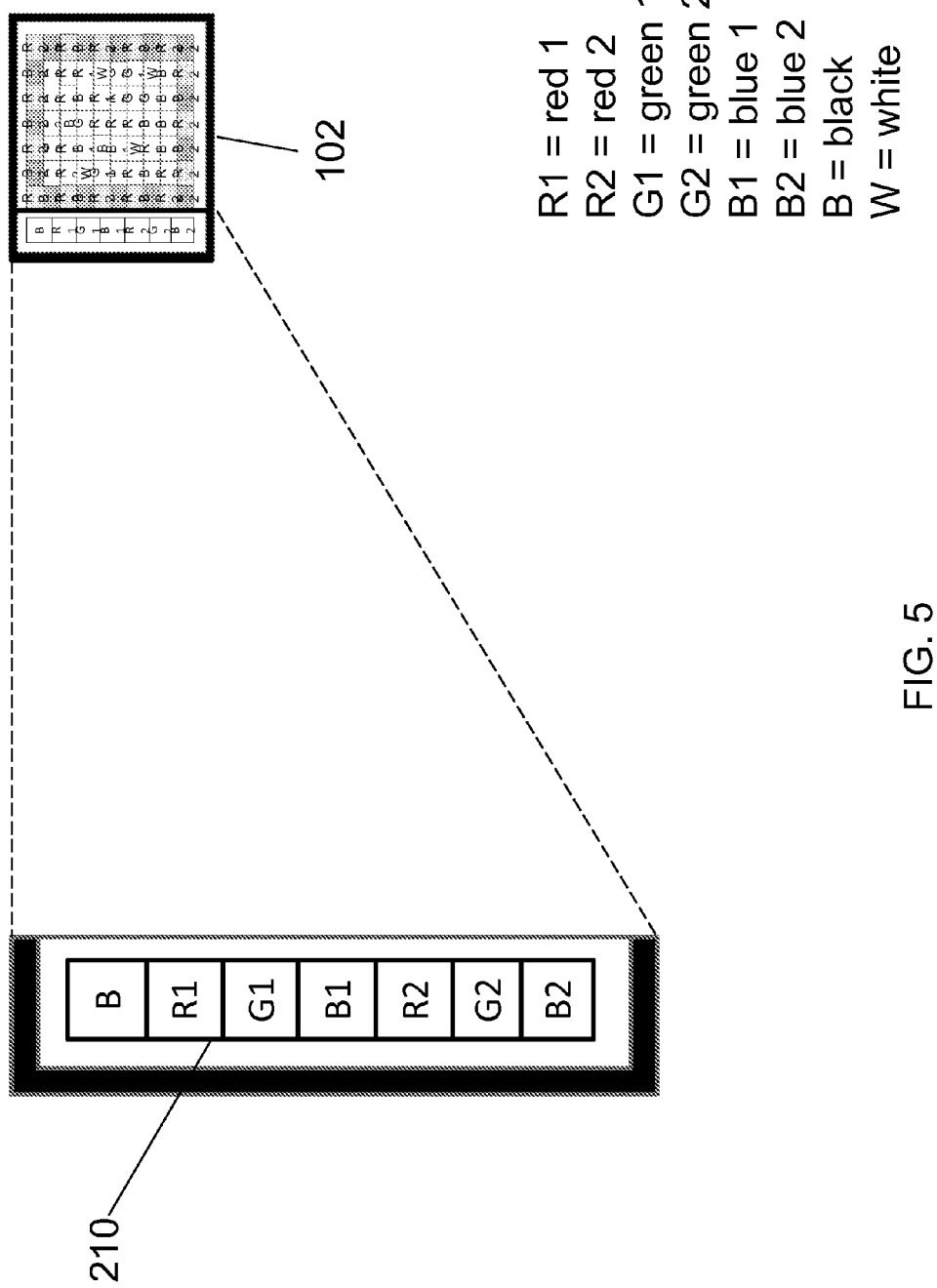
FIG. 5 illustrates a block diagram of color calibration cells for restoration of proper color based on distinguishable color samples in accordance with certain embodiments of the present disclosure.

As described earlier, when decoding the image, the present system collects all colors belonging to a detected pixel rectangle. If most of the colors in the pixel rectangle could be recognized as one of the colors in the color calibration cells, the present system uses the corresponding color in the color calibration cells. Otherwise, the pixel rectangle is marked as an erasure. If a pixel-level block cannot be decoded, the whole pixel block is treated as an erasure. As described earlier, the erasures can be further restored by an appropriate error-correction algorithm. The two-level error correction and leveraging of erasure determinations significantly improves the quality of the decoding described earlier in connection with FIG. 4. In particular, the two-level error correction described herein allows the present system to recover information which otherwise would be lost.
Restoration of Proper Color in the Case of Distinguishable Color Samples FIG. 5 illustrates a block diagram of color calibration cells for restoration of proper color based on distinguishable color samples in accordance with certain embodiments of the present disclosure. FIG. 5 includes color calibration cells 210.

Color calibration cells 210 include all colors used to encode the rectangular cells. In some embodiments, a white frame or border surrounds color calibration cells 210 for the color white. In other embodiments, the present system may also include white as a color block in the color calibration cells arranged on the left hand side. The present system discerns each color based on its placement within color calibration cells 210. The present system then stores distorted pixels as color samples. Different variants of a distorted pixel are saved to point or refer to the same correct pixel. That is, distorted pixels are determined dynamically, based on the position of their colors among the color calibration cells. The distorted pixels are assigned estimated colors according to the color calibration cells.

As described earlier, during decoding (shown in FIG. 4), the present system translates a distorted pixel into one of the original colors in color calibration cells 210 using the nearest original color to the distorted pixel. For example, let color $C=(R,G,B)$ represent a red green blue (RGB) component representation of the color. According to Equation (1), described earlier, a pseudo-Euclidean distance between two colors $C_1$ and $C_2$ can be given by $\Delta C$, as described in Equation (1):

$$\Delta C = \sqrt{\left(2 + \frac{\bar{r}}{256}\right)\Delta R^2 + 4\Delta G^2 + \left(2 + \frac{255 - \bar{r}}{256}\right)\Delta B^2}$$

This distance generates a native pseudo-Euclidean metric in the color space. A color mapping can be represented by the set of pairs: (distorted color)→(correct color). The distorted color can be $C_1$, and the correct color can be $C_2$. The number of such color pairs should be greater than or equal to $N_c$, the total number of colors. This mapping can be determined based on the color calibration cells and on the color arrangement therein.

To restore a correct or proper color c* from a distorted color, the present system iterates over all pairs of distorted colors and correct colors. In particular, the present system selects the pair in which the distorted color portion of the pair is closest to the correct or proper color c*. In some embodiments, the determination of whether the distorted color portion is closest to the correct or proper color is made according to the pseudo-Euclidian metrics in the RGB color space. That is, the present system selects the pair in which $\Delta C$ is smallest according to Equation (1). The selected pair provides the correct color. Accordingly, the present system allows the correct colors to be restored, because the present system saves the correspondence between the distorted values and the original values. Therefore, the present system is able to leverage information about the way in which the colors were distorted relative to the original values as captured in the color calibration cells.

Frame Arrangement for Automatic Image Geometrical Distortion Correction

Figure 6:
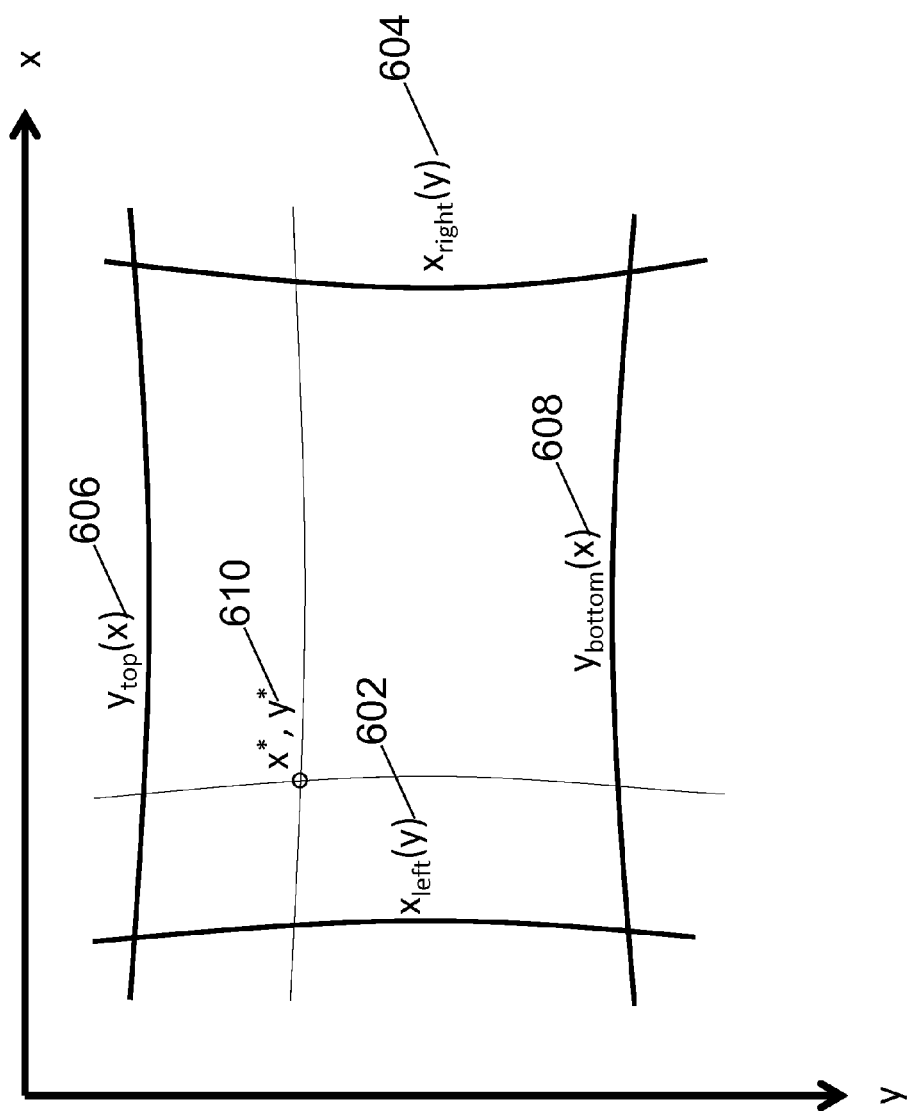
FIG. 6 illustrates a block diagram of a frame arrangement for geometrical distortion correction of an encoded image in accordance with certain embodiments of the present disclosure.

FIG. 6 illustrates a block diagram of a frame arrangement for geometrical distortion correction of an encoded image in accordance with certain embodiments of the present disclosure.

In some embodiments, the present system includes arrangements to recognize placement of rectangular cells and other elements in the encoded image. For example, these arrangements can include black frame 204, white frame 206, zebra frame 208, and color calibration sidebar 210 (shown in FIG. 2). The black frame and white frame surround the encoded rectangular cells. The color calibration sidebar contains sample colors (described earlier, in connection with FIG. 5). The zebra frame surrounds the encoded rectangular cells to allow the present system to determine appropriate resolution and pixel division of the encoded image.

The black frame and white frame allow the present system to determine and correct nonlinear distortion. As described earlier, nonlinear distortion can be introduced, for example, by camera lenses when registering an encoded image for decoding. In some embodiments, the present system uses the white frame as follows. The white frame can be restricted by curve $x_{left}(y)$ 602, curve $x_{right}(y)$ 604, curve $y_{top}(x)$ 606, and curve $y_{bottom}(x)$ 608. For every point $(x^*,y^*)$ 610 which belongs to the area restricted by curves 602-608, the present system can determine parameters a and b ($0 \le a \le 1$ and $0 \le b \le 1$) according to the following equations:

$$x_{left}(y^*)+ax_{right}(y^*)=x^* \quad (1\text{-}a)$$

$$y_{top}(x^*)+by_{bottom}(x^*)=y^* \quad (1\text{-}b)$$

The equation described above maps the area restricted by curves 602-608 to a unit rectangle defined by $0 \le a \le 1$, $0 \le b \le 1$. The unit rectangle can represent what the image would look like when "straightened out," by mapping the area restricted by curves 602-608 to the unit rectangle. That is, the distorted boundary of the image determined according to the area restricted by curves 602-608 can be mapped to the "straightened out" unit rectangle. The zebra frame can be used to determine parameters a and b. The present distortion correction therefore allows the original area having curved or non-linear sub-regions to be transformed according to the unit rectangle using parameters a and b.

The zebra frame allows the present system to determine a resolution of the embedded picture, and to divide the image into "bold" or unknown pixels. As described earlier, the color value of some pixels may be unknown. "Bold" pixels allow the present system to determine the proper color value of a pixel according to a voting process. In some embodiments, the voting process can choose the color value of the most frequent pixel close to the "bold" or unknown pixel to be the color value of the "bold" pixel. Otherwise, if the result of the voting is unclear—for example, if there is no pixel with a frequency much larger than the other pixels—the present system can mark the pixel as an erasure (i.e., missing). Therefore, using the two-level error correction described earlier, the pixel can be restored.

Image Fragmentation

Figure 7:
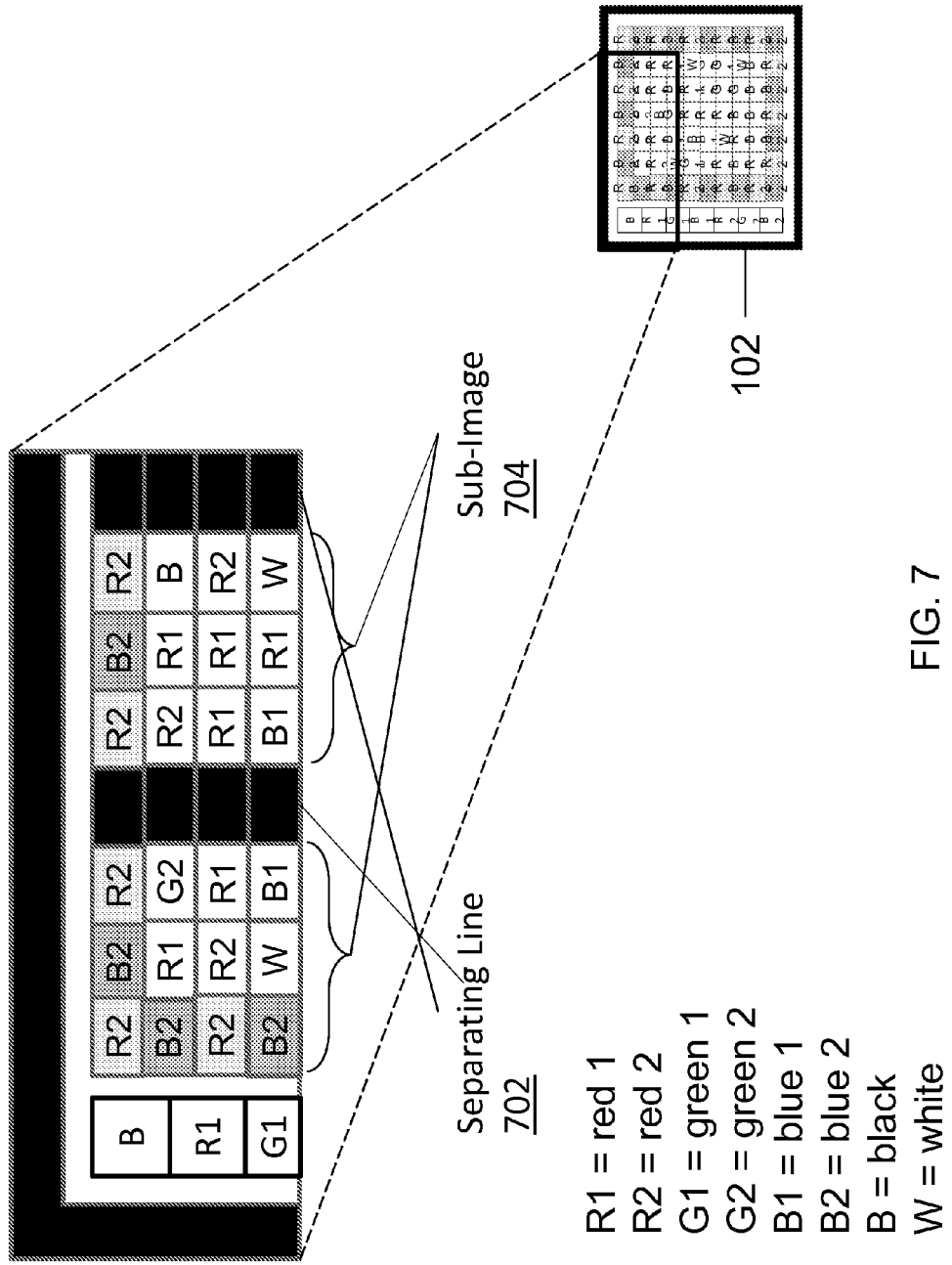
FIG. 7 illustrates a block diagram for frame fragmentation for distortion correction in accordance with certain embodiments of the present disclosure.

FIG. 7 illustrates a block diagram for frame fragmentation for distortion correction in accordance with certain embodiments of the present disclosure. The rectangular cells can be divided into sub-images 704 using separating lines 702.

Frame fragmentation or image fragmentation refers to a complementary technique to distortion correction (shown in FIG. 6). In some embodiments, dividing the image into a set of sub-images 704 allows the present system to work with every sub-image 704, without requiring the distortion compensation technique described earlier because sub-images 704 are sufficiently small that there is not as much distortion as with the entire encoded image. In some embodiments, sub-images 704 can be separated with separating lines 702. In some embodiments, separating lines 702 can be black lines, which can also became part of the zebra border.

The present system can use the same encoding and decoding techniques described earlier (shown in FIGS. 3 and 4) for encoding and decoding of sub-images 704. For example, the present system can leverage the two-level error correction, scrambler, etc. described earlier.

In some embodiments, the present system can skip the distortion correction described earlier (shown in FIG. 6). The present system can leverage the relatively smaller size of sub-images 704 to skip non-linear distortion compensation of each sub-image 704. Accordingly, the present system can decode sub-images 704 with better accuracy.

Network-Less Broadcast Information Distribution from Home/Public Displays.

Figure 8:
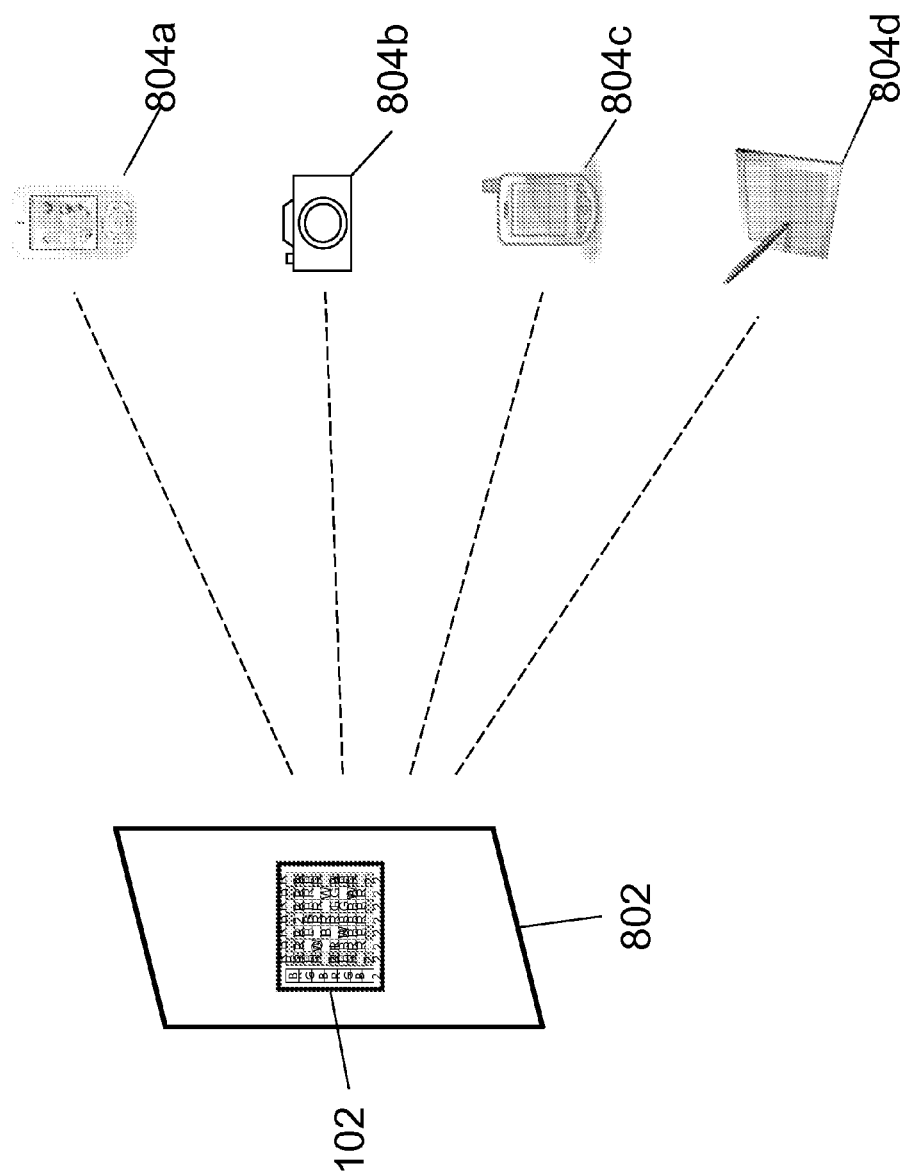
FIG. 8 illustrates a block diagram of a system for image-based information broadcasting using color space encoded images in accordance with certain embodiments of the present disclosure.

FIG. 8 illustrates a block diagram of a system 800 for image-based information broadcasting using color space encoded images in accordance with certain embodiments of the present disclosure. FIG. 8 includes a display 802 broadcasting information to a number of devices. The devices can include a smartphone 804a, a camera 804b, a palmtop or handheld device 804c, and/or a tablet or e-reader 804d. Display 802 can show a color space encoded image 102. Encoded image 102 can be encoded according to the process described earlier, in connection with FIG. 3.

Public places can include different types of displays 802. Non-limiting example displays can include fixed displays or dynamic displays. Fixed displays can include posters, flyers, signs, circulars, or larger displays such as billboards or advertisements. Dynamic displays can include different types of screens. The number of locations available for broadcasting information without using a network is large. The information depicted in displays 802 can vary as well. For example, the present system can use displays such as information boards in terminals, shops, or hotels. The data presented on displays 802 can be sized proportionally to display 802 itself. In some embodiments, if data presented on displays 802 would be small relative to the size of the display, display 802 can enlarge the data while preserving the aspect ratio of the data so the data can be presented in a form useful for observers.

In some embodiments, the present system can use color space encoded images such as encoded image 102 to broadcast information to observers without using a network. Since displays 102 can be as large as available space allows in homes or in public displays, the encoding process described earlier in connection with FIG. 3 can be used to present large amounts of data at high resolution. Example larger displays can include large posters or screens. As illustrated in FIG. 8, observers having devices with embedded cameras can register or capture encoded image 102. The devices can decode the encoded image according to the decoding process described in connection with FIG. 4. Accordingly, an observer can use and store the decoded machine data on the device. Advantageously, the present systems and method keep information close to the eyes of users.

A further advantage of image-based information broadcasting is that the number of users or observers who would otherwise be simultaneously using radio-based connections such as wireless networks or cellular networks will be lower. This is because decoding of encoded image 102 can be performed without needing radio networks, such as wireless networks or cellular networks. The present system is therefore particularly useful for crowded places such as airports or other public areas. The present system further allows users to download machine data directly. Because traditional bar code systems are not capable of encoding as much data as the present system, traditional bar codes can only provide access to significantly smaller amounts of information such as links to Web sites rather than the relevant data itself. Similarly, cables and other peripherals to maintain connections can be preserved because the present system is able to use an embedded camera.

In some embodiments, the present image-based information broadcasting can be used during conferences. Conferences typically involve large numbers of people, such as attendees and presenters. The present system can use public displays 802 and encoded image 102 to provide broad information distribution to many participants. For example, the present system can be used to help broadly distribute schedules, programs and program changes, and similar updates, all without needing a connection to radio-based networks such as wireless networks or cellular networks.

In some embodiments, the present system can be used in a user's home. For example, if a family is seated in a living room, then a television or other display device 802 can provide image-based information broadcast from one display to many in-home devices with embedded cameras.

Figure 9:
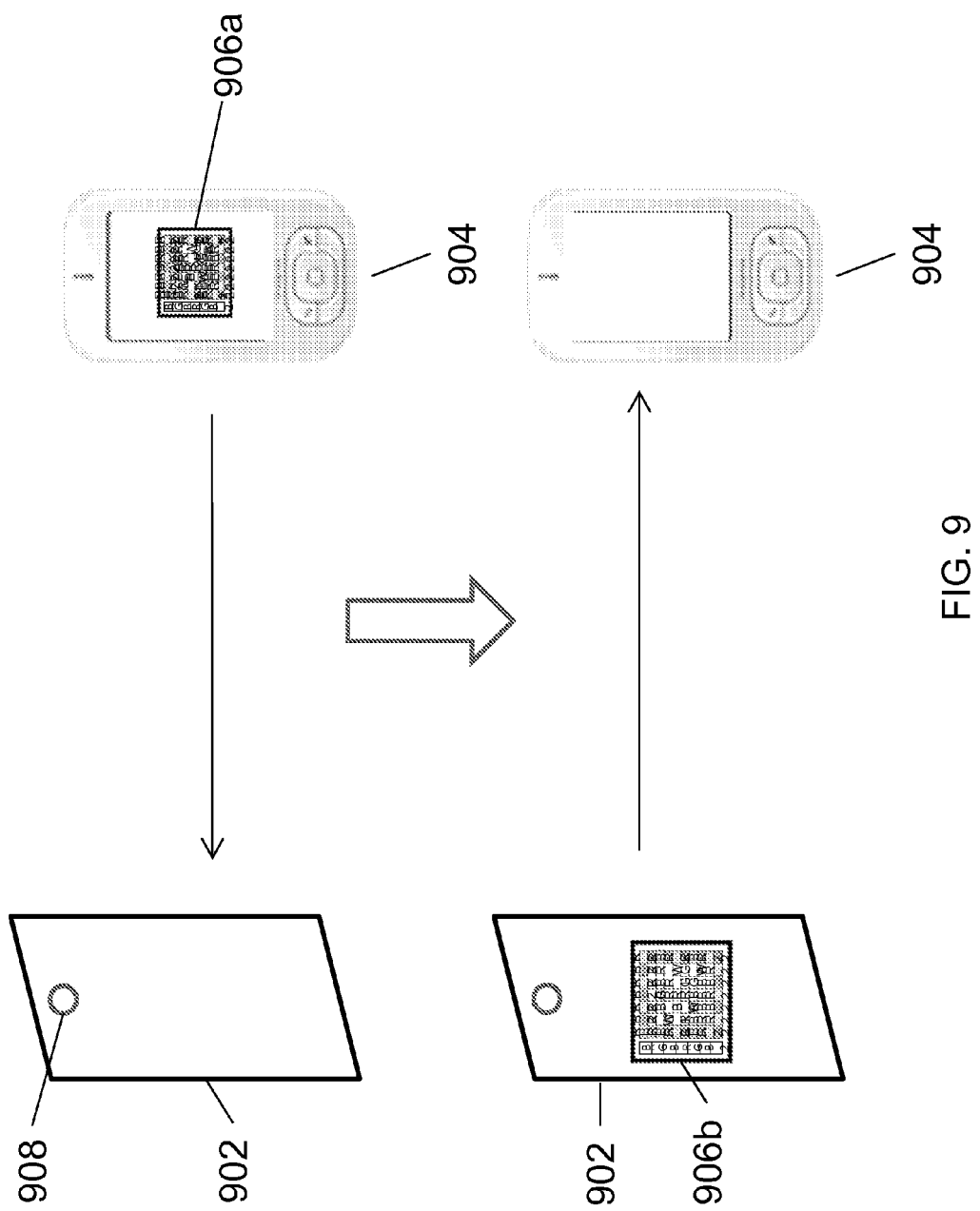
FIG. 9 illustrates a block diagram of broadcasting information independent of network availability in accordance with certain embodiments of the present disclosure.

FIG. 9 illustrates a block diagram of broadcasting information independent of network availability in accordance with certain embodiments of the present disclosure. FIG. 9 includes a screen 902 and a smartphone 904. Screen 902 can include an embedded camera 908. In some embodiments, the present system allows a user with a device such as smartphone 904 to broadcast information independent of network availability. Screen 902 can be a public display, and camera 908 can be a photo or video camera. The user can request information from screen 902. The user can use smartphone 904 to generate a color space encoded image 906a representing the request for information. For example, smartphone 904 can use a hardware module or software application to encode the request for information using the encoding process described earlier in connection with FIG. 3. In some embodiments, screen 902 can register or capture encoded image 906a, and send encoded image 906a to a remote server (not shown) for processing. The processing can include decoding encoded image 906a, according to the decoding process described earlier in connection with FIG. 4. Screen 902 can then receive the decoded information from the remote server. Screen 902 can process the received information to determine a result. Screen 902 can encode the result into a color space encoded image 906b. Smartphone 904 can then use an embedded camera to register or capture encoded image 906b. Smartphone 904 can then use the decoding module to decode encoded image 906b according to the decoding process described earlier in connection with FIG. 4.

In some embodiments, a user can use additional encoding to provide security for the exchanged information. For example, an intermediate archive file created during the encoding process can be password-protected. Furthermore, traditional encryption algorithms can be applied to encoded images 906a, 906b at the file level. In further embodiments, the present system can charge a fee to a user for the added benefit of security.

Although specific steps are disclosed in FIGS. 3 and 4, such steps are exemplary. That is, the present system is well-suited to performing various other steps or variations of the steps recited in FIGS. 3 and 4. The steps in FIGS. 3 and 4 may be performed in an order different than presented, and that not all of the steps may be performed. FIGS. 3 and 4 include processes that, in various embodiments, are carried out by a processor under the control of computer-readable and computer-executable instructions. Embodiments of the present disclosure may thus be stored as non-transitory computer-readable media or computer-executable instructions including, but not limited to, firmware updates, software update packages, or hardware (e.g., ROM).

Reference has been made in detail to various embodiments in accordance with the present disclosure, examples of which are illustrated in the accompanying drawings. While the invention has been described in conjunction with various embodiments, these various embodiments are not intended to limit the invention. On the contrary, the invention is intended to cover alternatives, modifications, and equivalents, which may be included within the scope of the invention as construed according to the appended claims. Furthermore, in the detailed description of various embodiments, numerous specific details have been set forth in order to provide a thorough understanding of the invention. However, the invention may be practiced without these specific details. In other instances, well known methods, procedures, components, and circuits have not been described in detail, so as not to unnecessarily obscure aspects of the invention.

Some portions of the detailed descriptions have been presented in terms of procedures, logic blocks, processing, and other symbolic representations of operations on data bits within a non-transitory computer memory. These descriptions and representations are the means used by those skilled in the data processing arts to most effectively convey the substance of their work to others skilled in the art. In the present disclosure, a procedure, logic block, process, or the like, is conceived to be a self-consistent sequence of operations or steps or instructions leading to a desired result. The operations or steps are those utilizing physical manipulations and transformations of physical quantities. Usually, although not necessarily, these quantities take the form of electrical or magnetic signals capable of being stored, transferred, combined, compared, and otherwise manipulated in a computer system or computing device. It has been convenient at times, principally for reasons of common usage, to refer to these signals as records, transactions, bits, values, elements, symbols, characters, samples, pixels, or the like.

Of course, all of these and similar terms are to be associated with the appropriate physical quantities and are merely convenient labels applied to these quantities. Unless specifically stated otherwise as apparent from the foregoing discussions, it is appreciated that throughout the present disclosure, discussions utilizing terms such as "deactivating," "disabling," "re-activating," "enabling," "sending," "receiving," "determining," "flushing," "responding," "generating," "making," "blocking," "accessing," "taking a snapshot," "associating," "allowing," "updating," or the like, refer to actions and processes of a computer system or similar electronic computing device or processor. The computer system or similar electronic computing device manipulates and transforms data represented as physical (electronic) quantities within the system memories, registers or other such information storage, transmission or display devices.

The present systems and methods can be implemented in a variety of architectures and configurations. For example, the present systems and methods can be implemented as part of a distributed computing environment, a cloud computing environment, a client server environment, etc. The embodiments described herein may be discussed in the general context of computer-executable instructions residing on some form of non-transitory computer-readable storage medium, such as program modules, executed by one or more computers, computing devices, or other devices. As described earlier, non-limiting examples of computer-readable storage media may include storage media and communication media. Generally, program modules include routines, programs, objects, components, data structures, etc., that perform particular tasks or implement particular abstract data types. The functionality of the program modules may be combined or distributed as desired in various embodiments.

The foregoing descriptions of specific embodiments of the present systems and methods have been presented for purposes of illustration and description. The specific embodiments are not intended to be exhaustive or to limit the invention to the precise forms disclosed, and many modifications and variations are possible in light of the above description. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

The invention claimed is:

1. A computer-implemented method for broadcasting information, the method comprising:
   receiving information at a first device for broadcasting;
   creating at the first device a first encoded image encoding the information by:
      creating colored cells within a color space to provide an encoded representation of the received information in the first encoded image by processing the received information to obtain a stream of integers, each integer in the stream of integers corresponding to a color in the color space for a cell in the first encoded image; and
      creating one or more additional cells, including color calibration cells, adjoining the first encoded image, the one or more additional cells created to decode the first encoded image by determining a pseudo-Euclidean metric in the color space, the metric measuring a distance including a measure of an average of: (a) a red component in the colored cells and (b) a red component in the color calibration cells; and
   displaying the first encoded image for a second device to receive optically without using a network to receive the first encoded image.

2. The method of claim 1, wherein displaying the first encoded image comprises displaying the first encoded image on at least one of a poster, flyer, sign, circular, billboard and advertisement.

3. The method of claim 1, wherein displaying the first encoded image comprises displaying the first encoded image using at least one of a television and a smartphone.

4. The method of claim 1, wherein displaying the first encoded image comprises displaying the first encoded image on at least one of a fixed display and a dynamic display.

5. The method of claim 1, wherein the first encoded image comprises an encoded version of at least one of schedule information, program information and update information.

6. The method of claim 1, further comprising:
   receiving, at the first device, a second encoded image having colored cells corresponding to a stream of integers encoding information;
   sending the second encoded image from the first device to a remote server for decoding; and
   receiving at the first device the decoded information from the remote server.

7. The method of claim 1, further comprising:
   in response to displaying the first encoded image, receiving a second encoded image from the second device, the second encoded image having colored cells corresponding to a stream of integers encoding a response from the second device.

8. A system for broadcasting information, the system comprising:
   memory;
   storage;
   at least one processor configured to use the memory and the storage to:
      receive information for broadcasting;
      create a first encoded image encoding the information by:
         creating colored cells within a color space to provide an encoded representation of the received information in the first encoded image by processing the received information to obtain a stream of integers, each integer in the stream of integers corresponding to a color in the color space for a cell in the first encoded image; and
         creating one or more additional cells, including color calibration cells, adjoining the first encoded image, the one or more additional cells created to decode the first encoded image by determining a pseudo-Euclidean metric in the color space, the metric measuring a distance including a measure of an average of: (a) a red component in the colored cells and (b) a red component in the color calibration cells; and
      displaying the first encoded image for a second device to receive optically without using a network to receive the first encoded image.

9. The system of claim 8, wherein the at least one processor is further configured to display the first encoded image using at least one of a television and a smartphone.

10. The system of claim 8, wherein the at least one processor is further configured to display the first encoded image on at least one of a fixed display and a dynamic display.

11. The system of claim 8, wherein the at least one processor is further configured to:
    receive, at the first device, a second encoded image having colored cells corresponding to a stream of integers encoding information;
    send the second encoded image from the first device to a remote server for decoding; and
    receive at the first device the decoded information from the remote server.

12. The system of claim 8, wherein the at least one processor is further configured to:
    in response to displaying the first encoded image, receive a second encoded image from the second device, the second encoded image having colored cells corresponding to a stream of integers encoding a response from the second device.

13. A non-transitory computer program product for broadcasting information, the non-transitory computer program product tangibly embodied in a computer-readable medium, the non-transitory computer program product including instructions operable to cause a data processing apparatus to:
    receive information at a first device for broadcasting;
    create at the first device a first encoded image encoding the information by:

creating colored cells within a color space to provide an encoded representation of the received information in the first encoded image by processing the received information to obtain a stream of integers, each integer in the stream of integers corresponding to a color in the color space for a cell in the first encoded image; and creating one or more additional cells, including color calibration cells, adjoining the first encoded image, the one or more additional cells created to decode the first encoded image by determining a pseudo-Euclidean metric in the color space, the metric measuring a distance including a measure of an average of: (a) a red component in the colored cells and (b) a red component in the color calibration cells; and display the first encoded image for a second device to receive optically without using a network to receive the first encoded image.

14. The non-transitory computer program product of claim 13, wherein the instructions are operable to further cause the data processing apparatus to display the first encoded image using at least one of a television and a smartphone.

15. The non-transitory computer program product of claim 13, wherein the instructions are operable to further cause the data processing apparatus to display the first encoded image on at least one of a fixed display and a dynamic display.

16. The non-transitory computer program product of claim 13, wherein the instructions are operable to further cause the data processing apparatus to:

receive, at the first device, a second encoded image having colored cells corresponding to a stream of integers encoding information;

send the second encoded image from the first device to a remote server for decoding; and receive at the first device the decoded information from the remote server.

17. The non-transitory computer program product of claim 13, wherein the instructions are operable to further cause the data processing apparatus to:

in response to displaying the first encoded image, receive a second encoded image from the second device, the second encoded image having colored cells corresponding to a stream of integers encoding a response from the second device.

* * * * *